United States Patent
Esseghir et al.

(10) Patent No.: US 9,387,625 B2
(45) Date of Patent: *Jul. 12, 2016

(54) PROCESS FOR PRODUCING CROSSLINKED, MELT-SHAPED ARTICLES

(71) Applicant: Union Carbide Chemicals & Plastics Technology LLC, Midland, MI (US)

(72) Inventors: Mohamed Esseghir, Monroe Township, NJ (US); Jeffrey M. Cogen, Flemington, NJ (US); Saurav S. Sengupta, Somerset, NJ (US)

(73) Assignee: Union Carbide Chemicals & Plastics Technology LLC, Midland, MI (US)

( * ) Notice: Subject to any disclaimer, the term of this patent is extended or adjusted under 35 U.S.C. 154(b) by 16 days.

This patent is subject to a terminal disclaimer.

(21) Appl. No.: 14/457,692

(22) Filed: Aug. 12, 2014

(65) Prior Publication Data
US 2015/0028518 A1    Jan. 29, 2015

Related U.S. Application Data

(63) Continuation of application No. 13/496,410, filed as application No. PCT/US2010/048720 on Sep. 14, 2010, now Pat. No. 8,835,548.

(60) Provisional application No. 61/242,857, filed on Sep. 16, 2009.

(51) Int. Cl.
C08L 83/04    (2006.01)
C08L 51/06    (2006.01)
(Continued)

(52) U.S. Cl.
CPC ............. *B29C 67/24* (2013.01); *B29C 45/0001* (2013.01); *B29C 45/16* (2013.01); *B29C 70/88* (2013.01); *C08F 220/10* (2013.01);
(Continued)

(58) Field of Classification Search
None
See application file for complete search history.

(56) References Cited

U.S. PATENT DOCUMENTS 3,646,155 A    2/1972    Scott
4,144,202 A    3/1979    Ashcraft et al.
(Continued)

FOREIGN PATENT DOCUMENTS

CA    2084361 A1 *    6/1994    .............. C08L 43/04
EP    1018533    7/2000
(Continued)

OTHER PUBLICATIONS

Written Translation of JP62-143958A. Jun. 27, 1987.*
(Continued)

*Primary Examiner* — Robert C Boyle
*Assistant Examiner* — Stephen Rieth
(74) *Attorney, Agent, or Firm* — Whyte Hirschboeck Dudek S.C.

(57) ABSTRACT

Crosslinked, melt-shaped articles are manufactured by a process that does not require the use of post-shaping external heat or moisture, the process comprising the steps of:
  A. Forming a crosslinkable mixture of a
    1. Organopolysiloxane containing one or more functional end groups; and
    2. Silane-grafted or silane-copolymerized polyolefin; and
  B. Melt-shaping and partially crosslinking the mixture; and
  C. Cooling and continuing crosslinking the melt-shaped article.
Crosslinking is promoted by the addition of a catalyst to the mixture before or during melt-shaping or to the melt-shaped article.

19 Claims, 3 Drawing Sheets

(51) Int. Cl.

| | | |
|---|---|---|
| *H01B 3/30* | (2006.01) | |
| *H01B 3/46* | (2006.01) | |
| *B29C 67/24* | (2006.01) | |
| *H01B 3/22* | (2006.01) | |
| *C08J 3/24* | (2006.01) | |
| *C08L 23/04* | (2006.01) | |
| *H01B 7/00* | (2006.01) | |
| *B29C 45/00* | (2006.01) | |
| *B29C 45/16* | (2006.01) | |
| *B29C 70/88* | (2006.01) | |
| *H01B 19/00* | (2006.01) | |
| *C08L 83/06* | (2006.01) | |
| *C08F 220/10* | (2006.01) | |
| *H01B 3/44* | (2006.01) | |
| *C08G 77/16* | (2006.01) | |
| *C08G 77/442* | (2006.01) | |
| *B29K 23/00* | (2006.01) | |
| *B29K 105/00* | (2006.01) | |
| *B29K 105/24* | (2006.01) | |
| *B29L 9/00* | (2006.01) | |
| *B29L 31/34* | (2006.01) | |

(52) U.S. Cl.
CPC . *C08J 3/24* (2013.01); *C08J 3/244* (2013.01); *C08J 3/246* (2013.01); *C08L 23/04* (2013.01); *C08L 51/06* (2013.01); *C08L 83/04* (2013.01); *C08L 83/06* (2013.01); *H01B 3/22* (2013.01); *H01B 3/307* (2013.01); *H01B 3/46* (2013.01); *H01B 7/00* (2013.01); *H01B 19/00* (2013.01); *B29K 2023/06* (2013.01); *B29K 2023/0625* (2013.01); *B29K 2023/18* (2013.01); *B29K 2105/0014* (2013.01); *B29K 2105/0067* (2013.01); *B29K 2105/0085* (2013.01); *B29K 2105/0088* (2013.01); *B29K 2105/24* (2013.01); *B29K 2995/0083* (2013.01); *B29K 2995/0097* (2013.01); *B29L 2009/00* (2013.01); *B29L 2031/3462* (2013.01); *C08G 77/16* (2013.01); *C08G 77/442* (2013.01); *C08J 2383/04* (2013.01); *C08J 2423/04* (2013.01); *C08L 2203/202* (2013.01); *C08L 2207/322* (2013.01)

(56) References Cited

U.S. PATENT DOCUMENTS

| | | | |
|---|---|---|---|
| 4,788,254 | A | 11/1988 | Kawakubo et al. |
| 4,806,594 | A | 2/1989 | Gross et al. |
| 5,064,802 | A | 11/1991 | Stevens et al. |
| 5,169,900 | A | 12/1992 | Gudelis |
| 5,246,783 | A | 9/1993 | Spenadel et al. |
| 5,266,627 | A | 11/1993 | Meverden et al. |
| 5,272,236 | A | 12/1993 | Lai et al. |
| 5,278,272 | A | 1/1994 | Lai et al. |
| 5,986,028 | A | 11/1999 | Lai et al. |
| 6,005,055 | A | 12/1999 | Dammert et al. |
| 6,048,935 | A | 4/2000 | Penfold et al. |
| 6,465,107 | B1 | 10/2002 | Kelly |
| 6,496,629 | B2 | 12/2002 | Ma et al. |
| 6,714,707 | B2 | 3/2004 | Rossi et al. |
| 7,041,744 | B2 | 5/2006 | Palmlof et al. |
| 8,835,548 | B2 * | 9/2014 | Esseghir .............. C08L 23/04 174/110 SR |

FOREIGN PATENT DOCUMENTS

| | | | |
|---|---|---|---|
| JP | 62143958 | A * | 6/1987 |
| JP | 2640129 | B2 | 8/1997 |
| WO | 9319104 | | 9/1993 |
| WO | 9500526 | | 1/1995 |
| WO | 9514024 | | 5/1995 |
| WO | 9810724 | | 3/1998 |
| WO | 9849212 | | 11/1998 |

OTHER PUBLICATIONS

Machine translation of JP 2640129 B2. Aug. 13, 1997.

\* cited by examiner

PROCESS FOR PRODUCING CROSSLINKED, MELT-SHAPED ARTICLES

FIELD OF THE INVENTION

This invention relates to crosslinked, melt-shaped articles. In one aspect, the invention relates to a process for producing crosslinked, melt-shaped articles while in another aspect, the invention relates to such a process in which the articles are crosslinked using an organopolysiloxane containing two or more functional end groups. In yet another aspect, the invention relates to such a process in which the crosslinking is accomplished without requiring the use of post-shaping external heat or moisture.

BACKGROUND OF THE INVENTION

Compositions used in the manufacture of crosslinkable articles, such as heat resistant wire & cable coatings and molded parts and accessories, typically require crosslinking after final shaping. Various crosslinking methods are practiced in the art, two of which are in wide usage, i.e., peroxide crosslinking and moisture cure (the latter of which usually employs a silane grafted or copolymerized polyolefin).

Moisture cure systems have the advantage in that they can be processed within a wide range of melt temperatures but are generally limited to thin wall constructions because the crosslinking relies on diffusion of external moisture into the article. Peroxide cure compositions are preferred for thick wall constructions, e.g. medium voltage (MV) cable insulation and molded cable accessories. These curable compounds need to be processed at temperatures which are below the peroxide decomposition temperature in order to avoid premature crosslinking (scorch) prior to forming the article. Once the article is formed, it needs to be heated uniformly to the peroxide decomposition temperature, and then held at that temperature for the time necessary to achieve the desired level of crosslinking. This can keep the production rate for such articles low due to poor heat transfer through the article walls. Furthermore, once the article is cooled, peroxide decomposition slows down to negligible levels; thus any significant crosslinking comes to an end. The combined problems of scorch and long heating and cure times (whether in-mold cure time or residence time in a continuous vulcanization tube) lead to long manufacturing cycles, and thus low productivity (units per time).

BRIEF SUMMARY OF THE INVENTION

In one embodiment the invention is a process for the manufacture of crosslinked, melt-shaped articles, the process comprising the steps of:
  A. Forming a crosslinkable mixture comprising:
    1. Organopolysiloxane containing two or more functional end groups; and
    2. Silane-grafted or silane-copolymerized polyolefin;
  B. Melt-shaping and partially crosslinking the mixture into an article; and
  C. Cooling and continuing crosslinking the melt-shaped article.

The process does not require the use of post-shaping external heat and/or moisture although either or both can be used if desired. Crosslinking can be promoted by the addition of a catalyst to the mixture before or during melt-shaping, or to the melt-shaped article (e.g., by diffusion from an adjoining layer if the article is a layer in a multilayer construction. Surprisingly, compounding a mixture containing these components produces a stable thermoplastic composition which can be shaped and partially crosslinked by melt processing into an article, but upon storage at ambient conditions undergoes thorough crosslinking without the need for external moisture or heat. At a microscopic scale the morphology of such a blend shows greater compatibility between the silicone and the polyolefin phases compared to either a physical (unreacted) siloxane/polyolefin blend or a physical, i.e., unreacted, blend of a siloxane and a silane-grafted polyolefin.

The process of this invention eliminates the reliance on external moisture diffusion that is required in conventional moisture cure. The process of this invention is particularly useful for manufacturing thick-wall (greater than (>) 0.2, more typically >0.5 and even more typically >1, millimeter (mm)), crosslinked constructions such as in high and medium voltage cable insulation, wire and cable molded elastomeric connectors and accessories, and molded automotive heat resistant parts. In the case of injection molded parts, after injection in a mold and once the article is formed, the compositions do not require additional heating or holding times to cure. Rather, the article can be cooled to achieve green strength to retain the desired shape as is common in thermoplastic injection molding operations. Once removed from the mold, the cure step continues off mold to achieve full cure. This approach improves manufacturing cycle time and achieves higher productivity (units per time).

In one embodiment hydroxyl-terminated silicone is reacted with an alkoxy silane (or silanol) that is grafted to a polyolefin or other polymer. Methods for preparation of such grafted polymers are well known. For example, vinyltrimethoxysilane (VTMS) can be grafted to polyethylene using peroxide. Also, various reactor copolymers are available, such as SI-LINK™, which is a copolymer of VTMS and ethylene available from The Dow Chemical Company.

Silicone polymers with hydroxyl end groups are readily available. Reactions of these silicones directly with grafted alkoxysilanes or silanols provide an interesting range of approaches, including:
  A. Crosslinking via direct reaction (at high levels for network formation or low level coupling for melt strength enhancement through long chain branches);
  B. Formation of silicone-functionalized polyolefins by operating under conditions that do not result in formation of a crosslinked network (e.g. use of monohydroxyl silicone or very low levels of dihydroxy silicone, or low graft levels on the polymer); if a suitable amount of SiOR remains in the system after functionalization, subsequent moisture crosslinking is possible; and
  C. Silane-grafted polyolefins can be dynamically crosslinked in the presence of polyolefins that do not contain grafted silane to make thermoplastic vulcanizates (TPV) using silicone-mediated crosslinking reactions.

In one embodiment the invention is a process for the manufacture of crosslinked, melt-shaped articles, the process comprising the steps of:
  A. Forming a crosslinkable mixture comprising:
    1. Organopolysiloxane containing two or more functional end groups;
    2. Polyolefin;
    3. Silane; and
    4. Peroxide;
  B. Melt-shaping the mixture into an article at conditions sufficient to graft the silane to the polyolefin and to partially crosslink the silane-grafted polyolefin; and
  C. Cooling and continuing the crosslinking of the article.

This embodiment combines the silane grafting of the polyolefin and the initiation of the crosslinking of the mixture into a single step.

In one embodiment the invention is a process for the manufacture of crosslinked, melt-shaped articles, the process comprising the steps of:
1. Preparing a silane-grafted polyolefin;
2. Mixing the silane-grafted polyolefin with a hydroxy-terminated polydimethylsiloxane;
3. Melt-shaping the mixture into a storage article;
4. Introducing the storage article to a second melt-shaping operation in which the storage article is melt-shaped into a finished article;
5. Introducing a crosslinking catalyst during or after the second melt-shaping operation; and
6. Cooling and crosslinking the finished article from the second melt-shaping operation.

This embodiment allows for the decoupling of the mixture-forming steps from the melt-shaping and crosslinking steps thus allowing the process to be performed over different spaces and times. The storage article is typically pellets which are re-melted and optionally mixed with a crosslinking catalyst to form the finished molded or extruded article.

DETAILED DESCRIPTION OF THE PREFERRED EMBODIMENT

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the component amounts of the composition and various process parameters.

"Cable" and like terms mean at least one wire or optical fiber within a protective insulation, jacket or sheath. Typically, a cable is two or more wires or optical fibers bound together, typically in a common protective insulation, jacket or sheath. The individual wires or fibers inside the jacket may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

"Polymer" means a compound prepared by reacting (i.e., polymerizing) monomers, whether of the same or a different type. The generic term polymer thus embraces the term "homopolymer", usually employed to refer to polymers prepared from only one type of monomer, and the term "interpolymer" as defined below.

"Interpolymer" and "copolymer" mean a polymer prepared by the polymerization of at least two different types of monomers. These generic terms include both classical copolymers, i.e., polymers prepared from two different types of monomers, and polymers prepared from more than two different types of monomers, e.g., terpolymers, tetrapolymers, etc.

"Ethylene polymer", "polyethylene" and like terms mean a polymer containing units derived from ethylene. Ethylene polymers typically comprise at least 50 mole percent (mol %) units derived from ethylene.

"Ethylene-vinylsilane polymer" and like terms mean an ethylene polymer comprising silane functionality. The silane functionality can be the result of either polymerizing ethylene with a vinyl silane, e.g., a vinyl trialkoxy silane comonomer, or, grafting such a comonomer onto an ethylene polymer backbone as described, for example, in U.S. Pat. No. 3,646,155 or 6,048,935.

"Blend," "polymer blend" and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Composition" and like terms mean a mixture or blend of two or more components. For example, in the context of preparing a silane-grafted ethylene polymer, a composition would include at least one ethylene polymer, at least one vinyl silane, and at least one free radical initiator. In the context of preparing a cable sheath or other article of manufacture, a composition would include an ethylene-vinylsilane copolymer, a catalyst cure system and any desired additives such as lubricants, fillers, anti-oxidants and the like.

"Ambient conditions" and like terms means temperature, pressure and humidity of the surrounding area or environment of an article. The ambient conditions of a typical office building or laboratory include a temperature of 23° C. and atmospheric pressure.

"Catalytic amount" means an amount of catalyst necessary to promote the crosslinking of an ethylene-vinylsilane polymer at a detectable level, preferably at a commercially acceptable level.

"Crosslinked", "cured" and similar terms mean that the polymer, before or after it is shaped into an article, was subjected or exposed to a treatment which induced crosslinking and has xylene or decalene extractables of less than or equal to 90 weight percent (i.e., greater than or equal to 10 weight percent gel content).

"Crosslinkable", "curable" and like terms means that the polymer, before or after shaped into an article, is not cured or crosslinked and has not been subjected or exposed to treatment that has induced substantial crosslinking although the polymer comprises additive(s) or functionality which will cause or promote substantial crosslinking upon subjection or exposure to such treatment (e.g., exposure to water).

"Melt-shaped" and like terms refer to an article made from a thermoplastic composition that has acquired a configuration as a result of processing in a mold or through a die while in a melted state. The melt-shaped article may be at least partially crosslinked to maintain the integrity of its configuration. Melt-shaped articles include wire and cable sheaths, compression and injection molded parts, sheets, tapes, ribbons and the like.

Ethylene Polymers

The polyethylenes used in the practice of this invention, i.e., the polyethylenes that contain copolymerized silane functionality or are subsequently grafted with a silane, can be produced using conventional polyethylene polymerization technology, e.g., high-pressure, Ziegler-Natta, metallocene or constrained geometry catalysis. In one embodiment, the polyethylene is made using a high pressure process. In another embodiment, the polyethylene is made using a mono- or bis-cyclopentadienyl, indenyl, or fluorenyl transition metal (preferably Group 4) catalysts or constrained geometry catalysts (CGC) in combination with an activator, in a solution, slurry, or gas phase polymerization process. The catalyst is preferably mono-cyclopentadienyl, mono-indenyl or mono-fluorenyl CGC. The solution process is preferred. U.S. Pat. No. 5,064,802, WO93/19104 and WO95/00526 disclose constrained geometry metal complexes and methods for their preparation. Variously substituted indenyl containing metal complexes are taught in WO95/14024 and WO98/49212.

In general, polymerization can be accomplished at conditions well-known in the art for Ziegler-Natta or Kaminsky-Sinn type polymerization reactions, that is, at temperatures from 0-250° C., preferably 30-200° C., and pressures from atmospheric to 10,000 atmospheres (1013 megaPascal (MPa)). Suspension, solution, slurry, gas phase, solid state powder polymerization or other process conditions may be employed if desired. The catalyst can be supported or unsupported, and the composition of the support can vary widely. Silica, alumina or a polymer (especially poly(tetrafluoroethylene) or a polyolefin) are representative supports, and desirably a support is employed when the catalyst is used in a gas phase polymerization process. The support is preferably employed in an amount sufficient to provide a weight ratio of catalyst (based on metal) to support within a range of from 1:100,000 to 1:10, more preferably from 1:50,000 to 1:20, and most preferably from 1:10,000 to 1:30. In most polymerization reactions, the molar ratio of catalyst to polymerizable compounds employed is from 10-12:1 to 10-1:1, more preferably from $10^{-9}:1$ to $10^{-5}:1$.

Inert liquids serve as suitable solvents for polymerization. Examples include straight and branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; perfluorinated hydrocarbons such as perfluorinated $C_{4-10}$ alkanes; and aromatic and alkyl-substituted aromatic compounds such as benzene, toluene, xylene, and ethylbenzene.

The ethylene polymers useful in the practice of this invention include ethylene/α-olefin interpolymers having a α-olefin content of between about 15, preferably at least about 20 and even more preferably at least about 25, wt % based on the weight of the interpolymer. These interpolymers typically have an α-olefin content of less than about 50, preferably less than about 45, more preferably less than about 40 and even more preferably less than about 35, wt % based on the weight of the interpolymer. The α-olefin content is measured by $^{13}C$ nuclear magnetic resonance (NMR) spectroscopy using the procedure described in Randall (Rev. Macromol. Chem. Phys., C29 (2&3)). Generally, the greater the α-olefin content of the interpolymer, the lower the density and the more amorphous the interpolymer, and this translates into desirable physical and chemical properties for the protective insulation layer.

The α-olefin is preferably a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, etc.) are α-olefins for purposes of this invention. Illustrative ethylene polymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, ethylene/propylene/diene monomer (EPDM) and ethylene/butene/styrene. The copolymers can be random or blocky.

The ethylene polymers used in the practice of this invention can be used alone or in combination with one or more other ethylene polymers, e.g., a blend of two or more ethylene polymers that differ from one another by monomer composition and content, catalytic method of preparation, etc. If the ethylene polymer is a blend of two or more ethylene polymers, then the ethylene polymer can be blended by any in-reactor or post-reactor process. The in-reactor blending processes are preferred to the post-reactor blending processes, and the processes using multiple reactors connected in series are the preferred in-reactor blending processes. These reactors can be charged with the same catalyst but operated at different conditions, e.g., different reactant concentrations, temperatures, pressures, etc, or operated at the same conditions but charged with different catalysts.

Examples of ethylene polymers made with high pressure processes include (but are not limited to) low density polyethylene (LDPE), ethylene silane reactor copolymer (such as SiLINK® made by The Dow Chemical Company), ethylene vinyl acetate copolymer (EVA), ethylene ethyl acrylate copolymer (EEA), and ethylene silane acrylate terpolymers.

Examples of ethylene polymers that can be grafted with silane functionality include very low density polyethylene (VLDPE) (e.g., FLEXOMER® ethylene/1-hexene polyethylene made by The Dow Chemical Company), homogeneously branched, linear ethylene/α-olefin copolymers (e.g., TAFMER® by Mitsui Petrochemicals Company Limited and EXACT® by Exxon Chemical Company), homogeneously branched, substantially linear ethylene/α-olefin polymers (e.g., AFFINITY® and ENGAGE® polyethylene available from The Dow Chemical Company), and ethylene block copolymers (e.g., INFUSE® polyethylene available from The Dow Chemical Company). The more preferred ethylene polymers are the homogeneously branched linear and substantially linear ethylene copolymers. The substantially linear ethylene copolymers are especially preferred, and are more fully described in U.S. Pat. Nos. 5,272,236, 5,278,272 and 5,986,028.

Silane Functionality

Any silane that will effectively copolymerize with ethylene, or graft to and crosslink an ethylene polymer, can be used in the practice of this invention, and those described by the following formula are exemplary:

in which $R^1$ is a hydrogen atom or methyl group; x and y are 0 or 1 with the proviso that when x is 1, y is 1; m and n are independently an integer from 1 to 12 inclusive, preferably 1 to 4, and each R" independently is a hydrolyzable organic group such as an alkoxy group having from 1 to 12 carbon atoms (e.g. methoxy, ethoxy, butoxy), aryloxy group (e.g. phenoxy), araloxy group (e.g. benzyloxy), aliphatic acyloxy group having from 1 to 12 carbon atoms (e.g. formyloxy, acetyloxy, propanoyloxy), amino or substituted amino groups (alkylamino, arylamino), or a lower alkyl group having 1 to 6 carbon atoms inclusive, with the proviso that not more than one of the three R groups is an alkyl. Such silanes may be copolymerized with ethylene in a reactor, such as a high pressure process. Such silanes may also be grafted to a suitable ethylene polymer by the use of a suitable quantity of organic peroxide, either before or during a shaping or molding operation. Additional ingredients such as heat and light stabilizers, pigments, etc., also may be included in the formulation. The phase of the process during which the crosslinks are created is commonly referred to as the "cure phase" and the process itself is commonly referred to as "curing". Also included are silanes that add to unsaturation in the polymer via free radical processes such as mercaptopropyl trialkoxysilane.

Suitable silanes include unsaturated silanes that comprise an ethylenically unsaturated hydrocarbyl group, such as a vinyl, allyl, isopropenyl, butenyl, cyclohexenyl or gamma-(meth)acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. Preferred silanes are the unsaturated alkoxy silanes which can be grafted onto the polymer or copolymerized in-reactor with other monomers (such as ethylene and acrylates). These silanes and their method of preparation are more fully described in U.S. Pat. No. 5,266,627 to Meverden, et al. Vinyl trimethoxy silane (VTMS), vinyl triethoxy silane, vinyl triacetoxy silane, gamma-(meth) acryloxy propyl trimethoxy silane and mixtures of these silanes are the preferred silane crosslinkers for use in this invention. If filler is present, then preferably the crosslinker includes vinyl trialkoxy silane.

The amount of silane crosslinker used in the practice of this invention can vary widely depending upon the nature of the polymer, the silane, the processing or reactor conditions, the grafting or copolymerization efficiency, the ultimate application, and similar factors, but typically at least 0.5, preferably at least 0.7, weight percent is used. Considerations of convenience and economy are two of the principal limitations on the maximum amount of silane crosslinker used in the practice of this invention, and typically the maximum amount of silane crosslinker does not exceed 5, preferably it does not exceed 3, weight percent.

The silane crosslinker is grafted to the polymer by any conventional method, typically in the presence of a free radical initiator, e.g. peroxides and azo compounds, or by ionizing radiation, etc. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, and tert-butyl peracetate. A suitable azo compound is 2,2-azobisisobutyronitrile. The amount of initiator can vary, but it is typically present in an amount of at least 0.04, preferably at least 0.06, parts per hundred resin (phr). Typically, the initiator does not exceed 0.15, preferably it does not exceed about 0.10, phr. The weight ratio of silane crosslinker to initiator also can vary widely, but the typical crosslinker:initiator weight ratio is between 10:1 to 500:1, preferably between 18:1 and 250:1. As used in parts per hundred resin or phr, "resin" means the olefinic polymer.

While any conventional method can be used to graft the silane crosslinker to the polyolefin polymer, one preferred method is blending the two with the initiator in the first stage of a reactor extruder, such as a Buss kneader. The grafting conditions can vary, but the melt temperatures are typically between 160 and 260° C., preferably between 190 and 230° C., depending upon the residence time and the half life of the initiator.

Copolymerization of vinyl trialkoxysilane crosslinkers with ethylene and other monomers may be done in a high-pressure reactor that is used in the manufacture of ethylene homopolymers and copolymers with vinyl acetate and acrylates.

Polyfunctional Organopolysiloxane with Functional End Groups

The oligomers containing functional end groups useful in the present process comprise from 2 to 100,000 or more units of the formula $R_2SiO$ in which each R is independently selected from a group consisting of alkyl radicals comprising one to 12 carbon atoms, alkenyl radicals comprising two to about 12 carbon atoms, aryls, and fluorine substituted alkyl radicals comprising one to about 12 carbon atoms. The radical R can be, for example, methyl, ethyl, n-propyl, isopropyl, n-butyl, sec-butyl, dodecyl, vinyl, allyl, phenyl, naphthyl, tolyl, and 3,3,3-trifluoropropyl. Preferred is when each radical R is methyl.

In one embodiment, the organopolysiloxane containing one or more functional end groups is a hydroxyl-terminated polydimethylsiloxane containing at least two hydroxyl end groups. Such polydimethylsiloxanes are commercially available, for example as silanol-terminated polydimethylsiloxane from Gelest, Inc. However, polydimethylsiloxanes having other terminal groups that can react with grafted silanes may be used e.g. polydimethylsiloxanes with amine end groups and the like. In addition, the polysiloxane may be a moisture-crosslinkable polysiloxane. In preferred embodiments, the polydimethylsiloxane is of the formula in which Me is methyl and n is in the range of 2 to 100,000 or more, preferably in the range of 10 to 400 and more preferably in the range of 20 to 120. Examples of suitable polyfunctional organopolysiloxanes are the silanol-terminated polydimethylsiloxane DMS-15 (Mn of 2,000-3,500, viscosity of 45-85 centistokes, —OH level of 0.9-1.2%) from Gelest Corp., and Silanol Fluid 1-3563 (viscosity 55-90 centistokes, —OH level of 1-1.7%) from Dow Corning Corp. In some embodiments the polyfunctional organopolysiloxane comprises branches such as those imparted by Me-SiO$_{3/2}$ or SiO$_{4/2}$ groups (known as T or Q groups to those skilled in silicone chemistry).

The amount of polyfunctional organopolysiloxane used in the practice of this invention can vary widely depending upon the nature of the polymer, the silane, the polyfunctional organopolysiloxane, the processing or reactor conditions, the ultimate application, and similar factors, but typically at least 0.5, preferably at least 2, weight percent is used. Considerations of convenience and economy are two of the principal limitations on the maximum amount of polyfunctional organopolysiloxane used in the practice of this invention, and typically the maximum amount of polyfunctional organopolysiloxane does not exceed 20, preferably it does not exceed 10, weight percent.

Crosslinking Catalyst

Crosslinking catalysts include the Lewis and Brønsted acids and bases. Lewis acids are chemical species that can accept an electron pair from a Lewis base. Lewis bases are chemical species that can donate an electron pair to a Lewis acid. Lewis acids that can be used in the practice of this invention include the tin carboxylates such as dibutyl tin dilaurate (DBTDL), dimethyl hydroxy tin oleate, dioctyl tin maleate, di-n-butyl tin maleate, dibutyl tin diacetate, dibutyl tin dioctoate, stannous acetate, stannous octoate, and various other organo-metal compounds such as lead naphthenate, zinc caprylate and cobalt naphthenate. DBTDL is a preferred Lewis acid. Lewis bases that can be used in the practice of this invention include, but are not limited to, the primary, secondary and tertiary amines. These catalysts are typically used in moisture cure applications.

Brønsted acids are chemical species that can lose or donate a hydrogen ion (proton) to a Brønsted base. Brønsted bases are chemical species that can gain or accept a hydrogen ion from a Brønsted acid. Brønsted acids that can be used in the practice of this invention include sulfonic acid.

The minimum amount of crosslinking catalyst used in the practice of this invention is a catalytic amount. Typically this amount is at least 0.01, preferably at least 0.02 and more preferably at least 0.03, weight percent (wt %) of the combined weight of ethylene-vinylsilane polymer and catalyst. The only limit on the maximum amount of crosslinking catalyst in the ethylene polymer is that imposed by economics and practicality (e.g., diminishing returns), but typically a general maximum comprises less than 5, preferably less than 3 and more preferably less than 2, wt % of the combined weight of ethylene polymer and condensation catalyst.

Fillers and Additives

The composition from which the crosslinked article, e.g., cable insulation layer or protective jacket, injection molded elastomeric connector, etc., or other article of manufacture, e.g., seal, gasket, shoe sole, etc., is made can be filled or unfilled. If filled, then the amount of filler present should preferably not exceed an amount that would cause unacceptably large degradation of the electrical and/or mechanical properties of the silane-crosslinked, ethylene polymer. Typically, the amount of filler present is between 2 and 80, preferably between 5 and 70, weight percent (wt %) based on the weight of the polymer. Representative fillers include kaolin clay, magnesium hydroxide, silica, calcium carbonate and carbon blacks. The filler may or may not have flame retardant properties. In a preferred embodiment of this invention in which filler is present, the filler is coated with a material that will prevent or retard any tendency that the filler might otherwise have to interfere with the silane cure reaction. Stearic acid is illustrative of such a filler coating. Filler and catalyst are selected to avoid any undesired interactions and reactions, and this selection is well within the skill of the ordinary artisan.

The compositions of this invention can also contain additives such as, for example, antioxidants (e.g., hindered phenols such as, for example, IRGANOX™ 1010 a registered trademark of Ciba Specialty Chemicals), phosphites (e.g., IRGAFOS™ 168 a registered trademark of Ciba Specialty Chemicals), UV stabilizers, cling additives, light stabilizers (such as hindered amines), plasticizers (such as dioctylphthalate or epoxidized soy bean oil), scorch inhibitors, mold release agents, tackifiers (such as hydrocarbon tackifiers), waxes (such as polyethylene waxes), processing aids (such as oils, organic acids such as stearic acid, metal salts of organic acids), oil extenders (such as paraffin oil and mineral oil), colorants or pigments to the extent that they do not interfere with desired physical or mechanical properties of the compositions of the present invention. These additives are used in amounts known to those versed in the art.

Liquid Polymer Modifier

In an embodiment, the process includes adding a liquid polymer modifier during the manufacture process of the crosslinked, melt-shaped article. A "liquid polymer modifier, " as used herein, is a non-functionalized plasticizer (NFP). As used herein, an "NFP" is a hydrocarbon liquid, which does not include to an appreciable extent functional groups selected from hydroxide, aryls and substituted aryls, halogens, alkoxys, carboxylates, esters, carbon unsaturation, acrylates, oxygen, nitrogen, and carboxyl. By "appreciable extent," it is meant that these groups and compounds comprising these groups are not deliberately added to the NFP, and if present at all, are present in embodiments at less than 5 percent by weight of the NFP, or less than 4, 3, 2, 1, 0.7, 0.5, 0.3, 0.1, 0.05, 0.01, or 0.001 wt %, based upon the weight of the NFP.

In an embodiment, aromatic moieties (including any compound whose molecules have the ring structure characteristic of benzene, naphthalene, phenanthrene, anthracene, etc.) are substantially absent from the NFP. In another embodiment, naphthenic moieties (including any compound whose molecules have a saturated ring structure such as would be produced by hydrogenating benzene, naphthalene, phenanthrene, anthracene, etc.) are substantially absent from the NFP. By "substantially absent," it is meant that these compounds are not added deliberately to the compositions and if present at all, are present at less than 0.5 wt %, preferably less than 0.1 wt % by weight of the NFP.

In another embodiment, the NFP does not contain olefinic unsaturation to an appreciable extent. By "appreciable extent of olefinic unsaturation" it is meant that the carbons involved in olefinic bonds account for less than 10% of the total number of carbons in the NFP, preferably less than 8%, 6%, 4%, 2%, 1%, 0.7%, 0.5%, 0.3%, 0.1%, 0.05%, 0.01%, or 0.001%. In some embodiments, the percent of carbons of the NFP involved in olefinic bonds is between 0.001 and 10% of the total number of carbon atoms in the NFP, preferably between 0.01 and 5%, preferably between 0.1 and 2%, more preferably between 0.1 and 1%.

In an embodiment, the liquid polymer modifier is an NFP that is a phthalate-free hydrogenated $C_8$ to $C_{12}$ poly-alpha-olefin. The phthalate-free hydrogenated $C_8$ to $C_{12}$ poly-alpha-olefin is naturally inert and does not affect the cure chemistry of the crosslinkable mixture as do conventional modifiers like mineral oil, white oil and paraffinic oils. Similarly, the present liquid polymer modifier does not affect other chemistries, such as, for example, antioxidant chemistry, filler chemistry, adhesion chemistry or the like.

In addition, the present liquid polymer modifier has high permanence, good compatibility with polyethylenes and ethylene copolymers, and narrow molecular weight distribution (Mw/Mn or MWD). As a result, applications using the present liquid polymer modifier have a surprising combination of desired properties including high cure efficiency, improved flexibility and toughness and easy processing. Such applications display excellent surface properties and exceptional retention of properties over time.

A nonlimiting example of a suitable liquid polymer modifier is polymer modifier sold under the tradename Elevast, such as Elevast R-150. Elevast polymer modifier is available from the ExxonMobil Chemical Company, Houston, Tex.

The liquid polymer modifier advantageously replaces oil extenders (paraffin oil and/or mineral oil) in the crosslinked, melt-shaped article. When compared to the same crosslinked, melt-shaped article with oil extender; a crosslinked, melt-shaped article containing the present liquid polymer modifier unexpectedly exhibits improved softness (i.e., lower Shore A Hardness value), increased flexibility, (i.e., increase in M100), greater elongation, enhanced elasticity, and improved processability (lower viscosity)—all with no decrease in dielectric strength of the crosslinked, melt-shaped article. The foregoing physical improvements from the liquid polymer modifier are surprising and unexpected in view of conventional oil extenders because oil extenders decrease dielectric strength in the resultant crosslinked product. Nonlimiting applications of crosslinked, melt-shaped article containing the present liquid polymer modifier and exhibiting the foregoing physical improvements (without loss of dielectric strength) include wire and cable, and other applications where good dielectric properties are required.

The liquid polymer modifier may be added during different steps of the production process. In an embodiment, the liquid polymer modifier is added to a crosslinkable mixture composed of (1) organopolysiloxane (with two or more hydroxyl end groups) and (2) a silane-grafted or silane-copolymerized polyolefin. This crosslinkable mixture is subsequently melt-shaped, partially crosslinked, cooled, and further crosslinked upon exposure to ambient conditions.

In an embodiment, the liquid polymer modifier is added to a crosslinkable mixture composed of (1) organopolysiloxane containing two or more hydroxyl end groups, (2) polyolefin, (3) silane, and (4) peroxide. The crosslinkable mixture is subsequently melt-shaped, partially crosslinked, cooled and further crosslinked when exposed to ambient conditions.

In an embodiment, the liquid polymer modifier is added with the crosslinking catalyst. A silane-grafted polyolefin is prepared to which a hydroxyl-terminated polydimethylsiloxane is added. The mixture is melt-shaped into a storage article. The storage article is introduced into a second melt-shaping operation wherein the storage article is melt-shaped into a finished article. The process includes introducing the crosslinking catalyst and the liquid polymer modifier during or after the second melt-shaping operation. The process further includes cooling and crosslinking the finished article from the second melt-shaping operation.

Compounding/Fabrication

Compounding of the silane-functionalized ethylene polymer, polyfunctional organopolysiloxane, catalyst, and filler and additives, if any, can be performed by standard means known to those skilled in the art. Examples of compounding equipment are internal batch mixers, such as a Banbury or Bolling internal mixer. Alternatively, continuous single or twin screw mixers can be used, such as a Farrel continuous mixer, a Werner and Pfleiderer twin screw mixer, or a Buss kneading continuous extruder. The type of mixer utilized, and the operating conditions of the mixer, will affect properties of the composition such as viscosity, volume resistivity, and extruded surface smoothness.

The components of the composition are typically mixed at a temperature and for a length of time sufficient to fully homogenize the mixture but insufficient to cause the material to gel. The catalyst is typically added to ethylene-vinylsilane polymer but it can be added before, with or after the additives, if any. Typically, the components are mixed together in a melt-mixing device. The mixture is then shaped into the final article. The temperature of compounding and article fabrication should be above the melting point of the ethylene-vinylsilane polymer but below about 250° C.

In some embodiments, either or both of the catalyst and the additives are added as a pre-mixed masterbatch. Such masterbatches are commonly formed by dispersing the catalyst and/or additives into an inert plastic resin, e.g., a low density polyethylene. Masterbatches are conveniently formed by melt compounding methods.

In one embodiment, one or more of the components are dried before compounding, or a mixture of components is dried after compounding, to reduce or eliminate potential scorch that may be caused from moisture present in or associated with the component, e.g., filler. In one embodiment, crosslinkable silicone-modified polyolefin mixtures are prepared in the absence of a crosslinking catalyst for extended shelf life, and the crosslinking catalyst is added as a final step in the preparation of a melt-shaped article.

Articles of Manufacture

In one embodiment, the composition of this invention can be applied to a cable as a sheath or insulation layer in known amounts and by known methods (for example, with the equipment and methods described in U.S. Pat. Nos. 5,246,783 and 4,144,202). Typically, the composition is prepared in a reactor-extruder equipped with a cable-coating die and after the components of the composition are formulated, the composition is extruded over the cable as the cable is drawn through the die. Cure may begin in the reactor-extruder.

One of the benefits of this invention is that the shaped article does not require post-shaping, e.g., after de-molding or passing through a shaping die, cure conditions, e.g., temperature above ambient and/or moisture from an external source such as a water bath or "sauna". While not necessary or preferred, the shaped article can be exposed to either or both elevated temperature and external moisture and if an elevated temperature, it is typically between ambient and up to but below the melting point of the polymer for a period of time such that the article reaches a desired degree of crosslinking. The temperature of any post-shaping cure should be above 0° C.

Other articles of manufacture that can be prepared from the polymer compositions of this invention include fibers, ribbons, sheets, tapes, tubes, pipes, weather-stripping, seals, gaskets, hoses, foams, footwear and bellows. These articles can be manufactured using known equipment and techniques.

Nonlimiting embodiments of the present disclosure are provided below.

E1. A process for the manufacture of crosslinked, melt-shaped articles is provided. The process comprises the steps of:
A. Forming a crosslinkable mixture comprising:
  1. Organopolysiloxane containing two or more functional end groups; and
  2. Silane-grafted or silane-copolymerized polyolefin;
B. Melt-shaping and partially crosslinking the mixture into an article; and
C. Cooling and continuing crosslinking the melt-shaped article.

E2. The process of E1 in which a crosslinking catalyst is added to the mixture before or during melt-shaping or to the melt-shaped article. E3. The process of any of E1-E2 in which at least one of the functional end groups of the organopolysiloxane is a hydroxyl group. E4. The process of any of E1-E3 in which the crosslinkable mixture comprises a liquid polymer modifier. E5. The process of any of E1-E4 in which the polyolefin is a polyethylene. E6. The process of any of E1-E5 in which the catalyst is a Lewis or Brønsted acid or base. E7. The process of any of E1-E6 in which the crosslinkable mixture comprises, based on the weight of the mixture:
A. 0.5 to 20 wt % of the organopolysiloxane; and
B. 0.01 to 0.2 wt % of the catalyst.

E8. The process of any of E1-E7 in which the crosslinkable mixture further comprises at least one of a filler, plasticizing agent, scorch retardant and moisture source. E9. The process of any of E1-E8 in which at least one of the crosslinkable mixture or a component of the mixture is subjected to drying conditions prior to melt shaping the crosslinkable mixture. E10. The process of any of E1-E9 in which at least one of the organopolysiloxane and catalyst is at least partially soaked into the silane-grafted or silane-copolymerized polyolefin at a temperature below the melting temperature of the polyolefin prior to melt-shaping the mixture.

Another process for the manufacture of crosslinked, melt-shaped articles is provided (E11) and the process comprises the steps of:
A. Forming a crosslinkable mixture comprising:
  1. Organopolysiloxane containing one or more functional end groups;
  2. Polyolefin;
  3. Silane; and
  4. Peroxide;
B. Melt-shaping the mixture into an article at conditions sufficient to graft the silane to the polyolefin and to partially crosslink the silane-grafted polyolefin; and
C. Cooling and continuing the crosslinking of the article.

E12. The process of E11 wherein the crosslinkable mixture comprises a liquid polymer modifier.

Another process for the manufacture of crosslinked, melt-shaped articles is provided (E13), the process comprising the steps of:
1. Preparing a silane-grafted polyolefin;
2. Mixing the silane-grafted polyolefin with a hydroxy-terminated polydimethylsiloxane;
3. Melt-shaping the mixture into a storage article;
4. Introducing the storage article to a second melt-shaping operation in which the storage article is melt-shaped into a finished article;
5. Introducing a crosslinking catalyst during or after the second melt-shaping operation; and
6. Cooling and crosslinking the finished article from the second melt-shaping operation.

E14. The process of E13 comprising introducing, with the crosslinking catalyst, a liquid polymer modifier.

E15. The process of any of E1-14 in which the mixture is melt-shaped by molding.

E16. The process of any of E1-14 in which the mixture is melt-shaped by extrusion.

E17. A thick-walled article made by the process of any of E1-14.

E18. An electric power cable comprising an insulation layer made by the process of any of E1-14.

E19. An electric power cable accessory or molded connector comprising an insulation layer made by the process of any of E1-14.

The invention is described more fully through the following examples. Unless otherwise noted, all parts and percentages are by weight.

SPECIFIC EMBODIMENTS

Example 1

Table 1 reports the evaluation of several compositions. ENGAGE™ 8200 plastomer (an ethylene-octene copolymer of 5 MI, 0.870 density, solid pellets) is used in the experiments. The polymer pellets are heated at 40° C. for two hours then tumble blended with a mixture of VTMS and LUPEROX 101 peroxide (2,5-dimethyl-2,5-di(t-butylperoxy)hexane available from Arkema) and left to soak in a glass jar using a jar roller until the pellets are visibly dry.

A Brabender batch mixer (250 gram) is used for grafting VTMS to the polymer. Compounding is conducted at 190° C. for 15 minutes. The grafted polymer is pressed into a plaque at room temperature and sealed in a foil bag for subsequent experiments with polydimethylsiloxane (PDMS).

A Brabender mixer (45 cc) is used to compound the grafted resin, silanol-terminated PDMS and catalyst. Compounding was performed at a set temperature of 150° C. as follows: First, the mixer was loaded with VTMS-grafted ENGAGE 8200, is fluxed and mixed for 2 minutes at 45 revolutions per minute (rpm). Silanol-terminated PDMS (Gelest DMS-S15) is added gradually over a period of approximately 3 minutes and after addition is completed, the blend is further mixed for 2 minutes at 45 rpm. Catalysts (DBTDL, sulfonic acid or mixture) are then added and mixed for 15 minutes at 45 rpm. If the resulting compound is thermoplastic, i.e. no significant crosslinking is visible, it is pressed into a 50 mil (~1.3 mm) plaque immediately after removal from the mixer and stored overnight in a sealed aluminum foil bag at 25° C.

Samples are then cut to analyze for cure via hot creep analysis (200° C. oven, 15 min). Percent elongation under 20 $N/mm^2$ load is then measured. A common standard for adequate crosslinking is elongation of less than or equal to ($\leq$) 100%. Measurements are obtained on triplicate samples.

TABLE 1

Hot Creep Test Results of Test Compositions

| Component | A | B | C | D | E | F |
|---|---|---|---|---|---|---|
| Si-g-PE | 0 | 99.85 | 95 | 94.85 | 94.85 | 99.85 |
| Sil-PDMS | 5 | 0 | 5 | 5 | 5 | 0 |
| Sulfonic Acid. | 0 | 0 | 0 | 0 | 0.15 | 0.15 |

TABLE 1-continued

Hot Creep Test Results of Test Compositions

| Component | A | B | C | D | E | F |
|---|---|---|---|---|---|---|
| DBTDL | 0 | 0.15 | 0 | 0.15 | 0 | 0 |
| ENGAGE 8200 | 95 | 0 | 0 | 0 | 0 | 0 |
| Total | 100 | 100 | 100 | 100 | 100 | 100 |
| Total Mixing Time (min) | 22 | 15 | 15 | 21 | 21 | 15 |
| Hot Creep (100% Elongation) | Melted | Fail | Fail | *Cross-linked prematurely | Pass | Fail |

*Since the sample crosslinked prematurely, the catalyst level was subsequently reduced as described in later examples.
Si-g-PE is silane grafted ENGAGE 8200 plastomer.
Sil-PDMS is Gelest DMS-S15 silanol-terminated PDMS.
Sulfonic acid is B-201 available from King Industries.
DBTDL is FASTCAT 4202 dibutyl tin dilaurate.
Hot Creep Test Percent Elongation measured at 200° C., 0.2 MPa load held for 15 minutes by IEC 60811-2-1.

As shown by the hot creep test results in Table 1, the addition of PDMS to either the base resin (sample A, a control) or a silane grafted resin (sample B) does not produce the desired cross-linking. Further comparative example (sample F), which represent conventional moisture cure, either failed the hot creep test after overnight storage with no external moisture exposure (except what may have been trapped during compounding or in the storage bag). Inventive samples D and E) in which OH-terminated PDMS is added to a grafted resin and further reacted with a catalyst produce effective crosslinking, either immediately during the compounding step in the mixer (sample D) or produced a thermoplastic compound, that could be shaped into a formed article (e.g. a plaque) and when stored overnight in sealed bag produced a homogenous crosslinking as shown by sample E. This is the desired result.

The data also shows that it is possible to design compositions that can be homogenously mixed to produce a thermoplastic material that exhibit excellent crosslinking without the need for external moisture exposure which is desirable for thick articles such as molded parts or medium voltage and high voltage cable coating.

Figure 1:
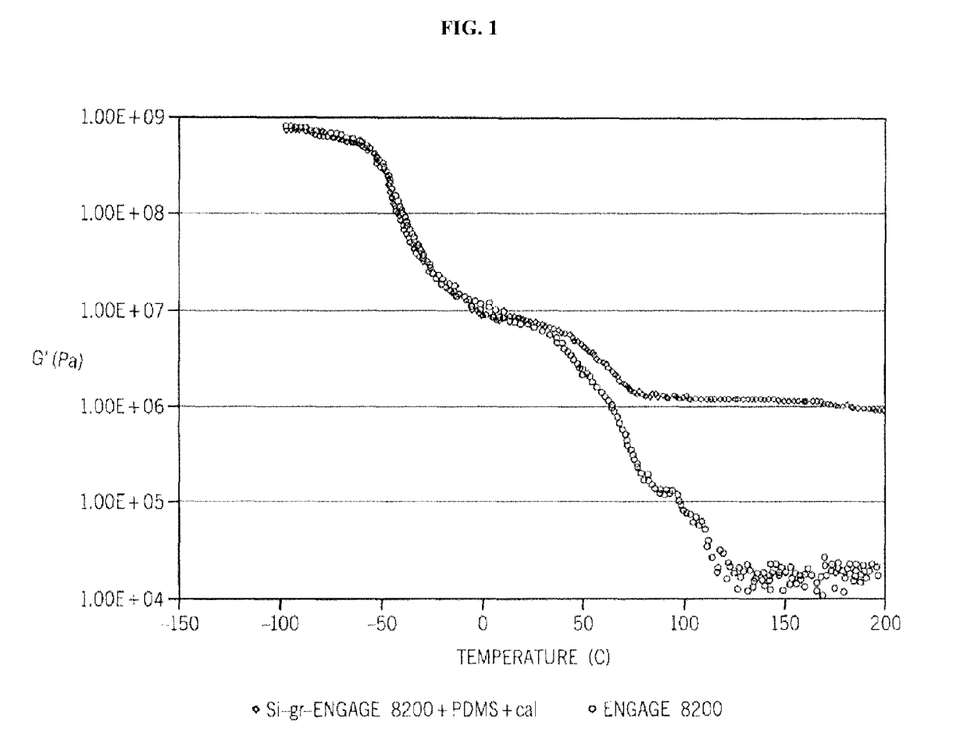
FIG. 1 is a graph reporting the data from a dynamic mechanical analysis (DMA) of an ENGAGE plastomer and an ENGAGE plastomer reactively modified with hydroxyl-terminated polydimethylsiloxane (PDMS).

As a further confirmation of crosslinking, the composition of sample E is repeated in another experiment, the sample made is subjected to a DMA analysis, with a temperature sweep from −150° C. to 200° C. As the data in the Figure shows, compared to the ENGAGE 8200 base resin (melting point ~70° C.), the modulus of the reactively-modified PDMS-ENGAGE blend exhibits a plateau past the melting point, indicating a good temperature resistance compared to the base resin.

Electron microscopy shows drastically improved phase compatibility. For example, sample E shows a predominantly single homogeneous phase with some finely dispersed silicone domains. In contrast, other compositions tested (samples A and C) show morphologies typical of highly immiscible systems containing distinct, large domains of silicone visible as droplets within the polyolefin matrix.

Example 2

The data reported in Table 2 compares an LLDPE resin (0.7 MI, 0.920 g/cm³ density) grafted with 2% VTMS in the presence of 3% silanol-terminated polydimethylsiloxane (OH-PDMS) versus a control sample grafted under the same conditions without the OH-PDMS. Both materials are first dried and then extruded on a wire (124 mil wire O.D., 30 mil wall thickness) in the presence of a tin catalyst. The insulation is removed, cured for 16 hours under ambient conditions (23 C and 70% relative humidity), and then subjected to a hot creep test at 200° C., 15 min, 15 N/m²). The results show that the comparative composition does not achieve 100% hot creep elongation and 10% hot set targets. In contrast, the inventive composition does pass the hot creep and hot set tests. The data demonstrate the rapid cure rate at ambient conditions achieved with the invention.

TABLE 2

Hot Creep and Hot Set Test Results of Test Compositions

|  | Inventive Composition | Comparative Composition |
|---|---|---|
| Hot Creep (% elongation) | Pass | Fail |
| Hot Set (% elongation) | Pass | Fail |

Example 3

Figure 2:
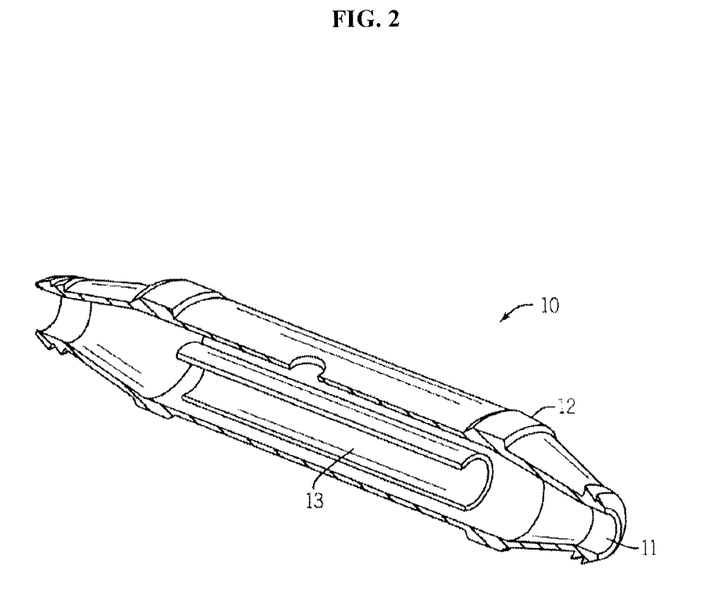
FIG. 2 is a schematic of a cross-section of a molded electrical connector comprising a thick-wall insulation layer sandwiched between two semiconductive layers.
Figure 3:
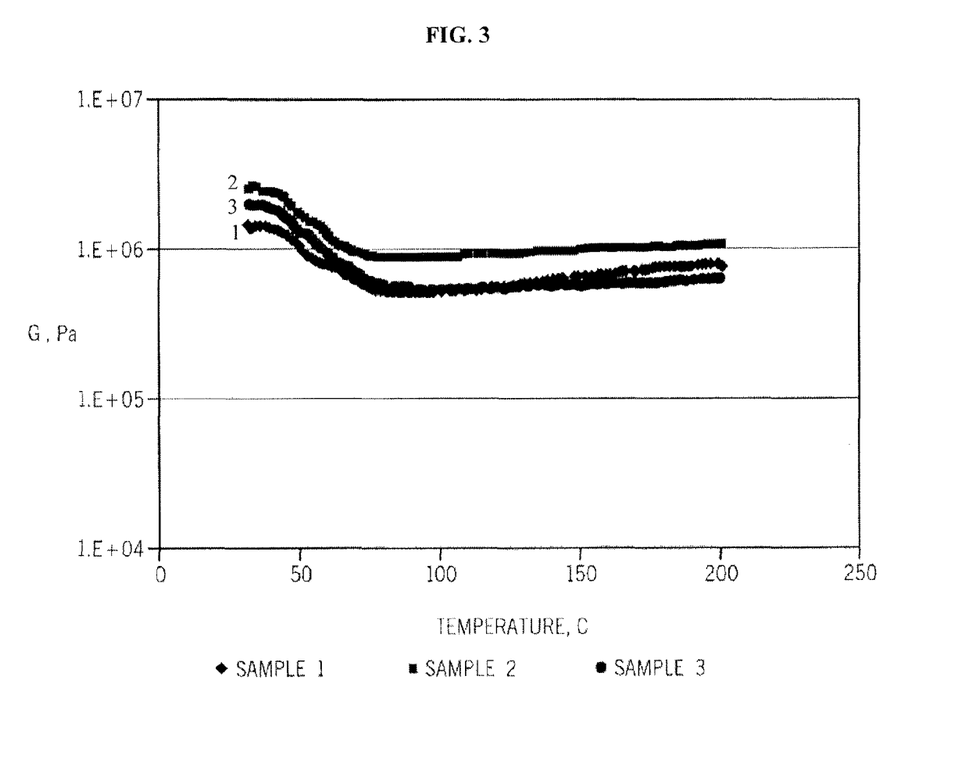
FIG. 3 is a graph reporting the DMA of the insulation layer of FIG. 2.

The data set for this example is obtained on a sample taken from a molded part. Molded part 10 (FIG. 2) comprises insulation layer 11 made out of an elastomer resin system which is grafted with vinyltrimethoxysilane in the presence of OH-PDMS. Molded part 10 is a 35 KV prototype connector comprising outer (12) and an inner (13) semicon layers sandwiching insulation layer 11. Insulation layer 11 comprises a composition of this invention. The semicon layers are first molded separately and peroxide-cured in a first molding step, then mounted together in a second mold where the insulation layer is injected between them. The insulation compound is premixed with a tin catalyst masterbatch, injection is conducted in a fully thermoplastic fashion, and the part is demolded upon cooling (1-5 minutes molding time depending on the test run). Inner semicon layer 13 is about 4 mm thick and covers most of the insulation, except towards the ends. Outer semicon layer 12 is about 3.5 mm thick and covers all the insulation layer, i.e. no external exposure, and insulation layer 11 itself is about 11.6 mm thick. Once received from the molding shop, the part is cut and three samples are taken from the middle section of the insulation layer for DMA testing. All samples are 1.9 mm thick. Starting from the outside edge of the insulation layer, Sample 1 is about 3 mm inside the layer, Sample 2 is about 5 mm inside the layer, and Sample 3 is about 7 mm inside the layer. The part is handled under normal shipping and lab storage conditions prior to testing, i.e. no special heat or moisture exposure. The DMA data in FIG. 3 shows a plateau modulus at a temperature above the melting point for each of the samples or in other words, complete cure of the material.

Although the invention has been described with certain detail through the preceding specific embodiments, this detail is for the primary purpose of illustration. Many variations and modifications can be made by one skilled in the art without departing from the spirit and scope of the invention as described in the following claims.

What is claimed is:
1. A process for the manufacture of crosslinked, melt-shaped articles, the process comprising the steps of:
   A. Forming a crosslinkable mixture comprising:
      1. an organopolysiloxane containing two functional end groups which are hydroxyl groups, wherein the organopolysiloxane is a polydimethylsiloxane of the formula wherein Me is methyl and n is from 10 to 400; and
2. silane-copolymerized polyolefin;

B. Melt-shaping and partially crosslinking the mixture into an article;

C. Cooling the melt-shaped article; and

D. Storing the melt-shaped article and continuing crosslinking without external moisture diffusion, wherein a crosslinking catalyst is added to the mixture before or during melt-shaping or to the melt-shaped article.

2. The process of claim 1 wherein the forming a crosslinkable mixture comprises mixing (1) at most 10 wt %, based on the total weight of the crosslinkable mixture, of the organopolysiloxane, and (2) the silane-copolymerized polyolefin.

3. The process of claim 1 wherein the melt-shaping and partially crosslinking the mixture comprises melt-shaping the mixture into an article having a thickness of greater than 0.2 mm.

4. The process of claim 1 wherein the storing of the melt-shaped article and continuing crosslinking without external moisture diffusion further comprises forming a crosslinked, melt-shaped article that passes the hot creep test (100% elongation) measured at 200° C., 0.2 MPa load held for 15 minutes in accordance with IEC 60811-2-1.

5. The process of claim 1 wherein the forming a crosslinkable mixture comprises mixing (1) the organopolysiloxane, and (2) an ethylene/silane copolymer.

6. The process of claim 5 wherein the forming a crosslinkable mixture comprises mixing (1) the organopolysiloxane, and (2) the ethylene/silane copolymer, wherein the silane is vinyl trialkoxysilane.

7. The process of claim 1 wherein the forming a crosslinkable mixture comprises mixing, based on the weight of the mixture, (1) 0.5 to 10 wt % of the organopolysiloxane, (2) the silane-copolymerized polyolefin, and (3) 0.01 to 0.2 wt % of the crosslinking catalyst.

8. The process of claim 1 further comprising subjecting at least one of the crosslinkable mixture or a component of the mixture to drying conditions prior to the melt-shaping.

9. The process of claim 1 further comprising at least partially soaking at least one of the organopolysiloxane and crosslinking catalyst into the silane-copolymerized polyolefin at a temperature below the melting temperature of the silane-copolymerized polyolefin prior to the melt-shaping.

10. The process of claim 1 wherein the melt-shaping and partially crosslinking the mixture into an article comprises melt-shaping the article into a cable coating.

11. The process of claim 1 further comprising adding the crosslinking catalyst which is a Lewis or Bronsted acid or base to the crosslinkable mixture before the melt-shaping.

12. The process of claim 1 further comprising adding the crosslinking catalyst which is a Lewis or Bronsted acid or base to the crosslinkable mixture during the melt-shaping.

13. The process of claim 1 further comprising adding the crosslinking catalyst which is a Lewis or Bronsted acid or base to the melt-shaped article.

14. The process of claim 1 further comprising adding the crosslinking catalyst which is a Bronsted acid to the crosslinkable mixture before the melt-shaping.

15. The process of claim 1 further comprising adding the crosslinking catalyst which is a Bronsted acid to the crosslinkable mixture during the melt-shaping.

16. The process of claim 1 further comprising adding the crosslinking catalyst which is a Bronsted acid to the melt-shaped article.

17. The process of claim 1 further comprising adding the crosslinking catalyst which is sulfonic acid to the crosslinkable mixture before the melt-shaping.

18. The process of claim 1 further comprising adding the crosslinking catalyst which is sulfonic acid to the crosslinkable mixture during the melt-shaping.

19. The process of claim 1 further comprising adding the crosslinking catalyst which is sulfonic acid to the melt-shaped article.

* * * * *